US012202224B2

(12) United States Patent
Onishi et al.

(10) Patent No.: US 12,202,224 B2
(45) Date of Patent: Jan. 21, 2025

(54) PAPER SHEET FITTING METHOD AND PAPER MOLDED ARTICLE

(71) Applicant: NISSHA CO., LTD., Kyoto (JP)

(72) Inventors: Atsushi Onishi, Kyoto (JP); Tetsu Nishikawa, Kyoto (JP); Shuhei Miyashita, Kyoto (JP); Hajime Nakagawa, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 18/251,820

(22) PCT Filed: Oct. 25, 2021

(86) PCT No.: PCT/JP2021/039351
§ 371 (c)(1),
(2) Date: May 4, 2023

(87) PCT Pub. No.: WO2022/097527
PCT Pub. Date: May 12, 2022

(65) Prior Publication Data

US 2023/0302757 A1 Sep. 28, 2023

(30) Foreign Application Priority Data

Nov. 9, 2020 (JP) ................................. 2020-186568

(51) Int. Cl.
*B31B 50/74* (2017.01)
*B31B 50/59* (2017.01)
*B31B 120/50* (2017.01)

(52) U.S. Cl.
CPC .......... *B31B 50/741* (2017.08); *B31B 50/592* (2018.05); *B31B 2120/50* (2017.08)

(58) Field of Classification Search
CPC . B31B 50/741; B31B 50/592; B31B 2120/50; B31B 50/64; B31B 50/88; B31B 70/142; B31B 70/64; B31B 50/59
(Continued)

(56) References Cited

U.S. PATENT DOCUMENTS 3,457,761 A * 7/1969 Brosseit ............... B21D 22/206 72/347
4,691,820 A * 9/1987 Martinez .............. B65D 75/326 206/205

(Continued)

FOREIGN PATENT DOCUMENTS

EP 1110710 B1 5/2005
JP H0813400 A 1/1996

(Continued)

OTHER PUBLICATIONS

"The Truth About v60 Filter Papers," YouTube Website, Available Online at youtube.com/watch?v=0uggibTY0AE, Oct. 31, 2018, 1 page.

(Continued)

*Primary Examiner* — Sameh Tawfik
(74) *Attorney, Agent, or Firm* — Alleman Hall & Tuttle LLP

(57) ABSTRACT

A method for fitting a paper sheet includes a water absorption step of causing a region of the paper sheet to absorb water, the region being at least a part of the paper sheet; a placing step of placing the region of the paper sheet between one set of first molding surfaces of a press mold; a molding step of molding the region of the paper sheet into a three-dimensional shape, by closing the press mold; a layering step of layering another paper sheet that is not caused to absorb water on the molded paper sheet, after opening the press mold; a fitting step of fitting the molded paper sheet and the another paper sheet by closing the press mold to
(Continued)

mold a laminate into a three-dimensional shape; and a removal step of removing a molded article including a fitting portion, after opening the press mold.

7 Claims, 13 Drawing Sheets

(58) Field of Classification Search
USPC ............................................................ 493/52
See application file for complete search history.

(56) References Cited

U.S. PATENT DOCUMENTS

| | | | | |
|---|---|---|---|---|
| 5,524,419 | A * | 6/1996 | Shannon | B29D 11/00259 425/808 |
| 5,833,805 | A * | 11/1998 | Emery | D21J 7/00 264/517 |
| 6,082,533 | A * | 7/2000 | Smith | B65D 75/32 206/210 |
| 7,074,302 | B2 * | 7/2006 | Renck | D21J 3/00 241/113 |
| 7,832,188 | B2 * | 11/2010 | O'Neill | B29C 66/81429 53/485 |
| 9,446,874 | B2 * | 9/2016 | Nelson | A61J 1/035 |
| 11,253,035 | B2 * | 2/2022 | Almond | B65D 75/58 |
| 11,702,239 | B2 * | 7/2023 | Doster | B32B 29/00 428/357 |
| 2014/0001074 | A1 * | 1/2014 | Longo | B29C 51/14 206/524.2 |
| 2017/0086552 | A1 * | 3/2017 | Michalos | B65D 81/22 |
| 2017/0165901 | A1 * | 6/2017 | Fischer | B29C 66/8322 |
| 2021/0069942 | A1 * | 3/2021 | Larsson | D21H 27/10 |

FOREIGN PATENT DOCUMENTS

| | | |
|---|---|---|
| JP | 2001097351 A | 4/2001 |
| JP | 2004243584 A | 9/2004 |
| JP | 2008137721 A | 6/2008 |
| JP | 2014145142 A | 8/2014 |

OTHER PUBLICATIONS

European Patent Office, Supplementary European Search Report Issued in Application No. 21889080, Jun. 7, 2024, Germany, 2 pages.

* cited by examiner

PAPER SHEET FITTING METHOD AND PAPER MOLDED ARTICLE

TECHNICAL FIELD

The present invention relates to a method for fitting a paper sheet and a paper molded article.

BACKGROUND ART

A paper molded article using pulp as a raw material has been conventionally known. Such a paper molded article and a method for manufacturing the paper molded article are referred to as a pulp mold, and are applied to a container, a cushioning material, and the like. In a conventional manufacturing method, first, a pulp suspension 11 in which pulp 10 is dispersed in water is injected into a tank in which a papermaking mold 12 including a recessed molding surface is installed, and the pulp suspension 11 is drawn in and dehydrated on the papermaking mold 12 through a suction hole formed in the papermaking mold 12 (see FIG. 12 at (a)). In this way, an intermediate body 13 is formed on the molding surface of the papermaking mold 12 (see FIG. 12 at (b)). Next, hot press molding is performed on the intermediate body 13 by a pressing mold 14 including a protruding molding surface fitted to the recessed molding surface of the papermaking mold 12 (see FIG. 12 at (c)). Then, the mold is opened, and a pulp molded article 15 is removed (see FIG. 12 at (d)).

As a method for layering two such pulp molded articles 15, for example, there is a method disclosed in Patent Document 1 (see FIG. 13). In this method, the pulp molded article 15 is layered on the intermediate body 13 obtained in FIG. 12 at (b) (see FIG. 13 at (a)), hot press molding is performed on the laminate by the pressing mold 14 (see FIG. 13 at (b)), and a pulp molded article 16 is removed (see FIG. 13 at (c)). According to the manufacturing method, moisture contained in the intermediate body 13 permeates through the pulp molded article 15, pulp fibers inside the intermediate body 13 and the pulp molded article 15 are drawn by surface tension of water, and a hydrogen bond is generated by the hot press. Thus, the pulp molded article 16 in which the intermediate body 13 and the pulp molded article 15 are bonded with sufficient bonding strength can be obtained.

CITATION LIST

Patent Literature

Patent Document 1: JP 2001-097351 A

SUMMARY OF INVENTION

Technical Problem

However, in the conventional manufacturing method of a paper molded article, the surface of the intermediate body 13 and the surface of the pulp molded article 15 are entirely bonded to each other. Thus, the pulp molded article 15 cannot be removed from the intermediate body 13. The conventional manufacturing method has a problem in that paper molded articles cannot be removably fitted to each other.

The present invention has been made in order to solve such a problem as described above, and an object of the present invention is to provide a method for fitting a paper sheet that allows paper sheets to be easily fitted to each other, and a paper molded article including a fitting portion.

Solution to Problem

A method for fitting a paper sheet according to the present invention includes:

- a water absorption step of causing a region of a paper sheet to absorb water, the region being at least a part of the paper sheet;
- a placing step of placing the region of the paper sheet caused to absorb water, such that the region is located between one set of first molding surfaces of a press mold;
- a molding step of molding, using the one set of first molding surfaces, the region of the paper sheet caused to absorb water into a three-dimensional shape, by closing the press mold;
- a layering step of layering another paper sheet that is not caused to absorb water on the molded paper sheet, after opening the press mold;
- a fitting step of fitting the molded paper sheet and the another paper sheet that is not caused to absorb water by closing the press mold to mold, using the one set of first molding surfaces, a laminate into a three-dimensional shape; and
- a removal step of removing a molded article including a fitting portion, after opening the press mold.

In the aspect described above, a step of molding the another paper sheet that is not caused to absorb water into the same shape as a shape of the molded paper sheet may be included before the fitting step.

Further, a method for fitting a paper sheet according to the present invention includes:

- a water absorption step of causing a region of one paper sheet to absorb water, the region being half of the paper sheet;
- a placing step of placing the region of the paper sheet caused to absorb water, such that the region is located between one set of first molding surfaces of a press mold;
- a molding step of molding, using the one set of first molding surfaces, the region of the paper sheet caused to absorb water into a three-dimensional shape, by closing the press mold;
- a layering step of layering the molded paper sheet and a region of the paper sheet that is not caused to absorb water by, after opening the press mold, folding the region of the paper sheet that is not caused to absorb water toward the molded paper sheet;
- a fitting step of fitting the molded paper sheet and the region that is not caused to absorb water, by closing the press mold to mold, using the one set of first molding surfaces, a laminate into a three-dimensional shape; and
- a removal step of removing a molded article including a fitting portion, after opening the press mold.

Further, a method for fitting a paper sheet according to the present invention includes:

- a water absorption step of causing a region of one paper sheet to absorb water, the region being half of the paper sheet;
- a placing step of placing the one paper sheet such that the region of the paper sheet caused to absorb water is located between one set of first molding surfaces of a first press mold and a region of the paper sheet that is not caused to absorb water is located between one set of second molding surfaces provided in a region different from the one set of first molding surfaces and having a reverse shape to a shape of the one set of first molding surfaces;

a molding step of molding, using the one set of first molding surfaces, the region of the paper sheet caused to absorb water into a three-dimensional shape and molding, using the one set of second molding surfaces, the region of the paper sheet that is not caused to absorb water into a reverse three-dimensional shape to the three-dimensional shape, by closing the first press mold;

a layering step of layering the molded paper sheet using the one set of first molding surfaces and the molded paper sheet using the one set of second molding surfaces, by, after opening the first press mold, folding the molded paper sheet using the one set of second molding surfaces toward the molded paper sheet using the one set of first molding surfaces;

a fitting step of fitting the paper sheets molded by the first press mold to each other, by pressing a laminate after placing the laminate between molding surfaces of a second press mold with the same shape as a shape of the one set of first molding surfaces and closing the second press mold; and a removal step of removing a molded article including a fitting portion, after opening the second press mold.

In any of the aspects described above, a basis weight of the paper sheet may be from 350 g/m$^2$ to 600 g/m$^2$.

In any of the aspects described above, a step of changing a shape of a part of the fitting portion into an undercut shape may be included in the fitting step or after the removal step.

In a paper molded article according to the present invention, at least a partial region includes two layers of paper sheets, the region is a fitting portion having a three-dimensional shape and also including the two layers of paper sheets in close contact with each other, and a region other than the fitting portion includes the two layers of paper sheets not in close contact with each other.

Advantageous Effects of Invention

According to the method for fitting a paper sheet of the present invention, paper sheets can be easily fitted to each other. Further, the paper molded article of the present invention can include a fitting portion.

DESCRIPTION OF EMBODIMENTS

Hereinafter, examples of embodiments of a method for fitting a paper sheet, and a paper molded article of the present invention will be described with reference to drawings.

First Embodiment

A first embodiment of a method for fitting a paper sheet will be described with reference to FIG. 1.

Water Absorption Step

Figure 1:
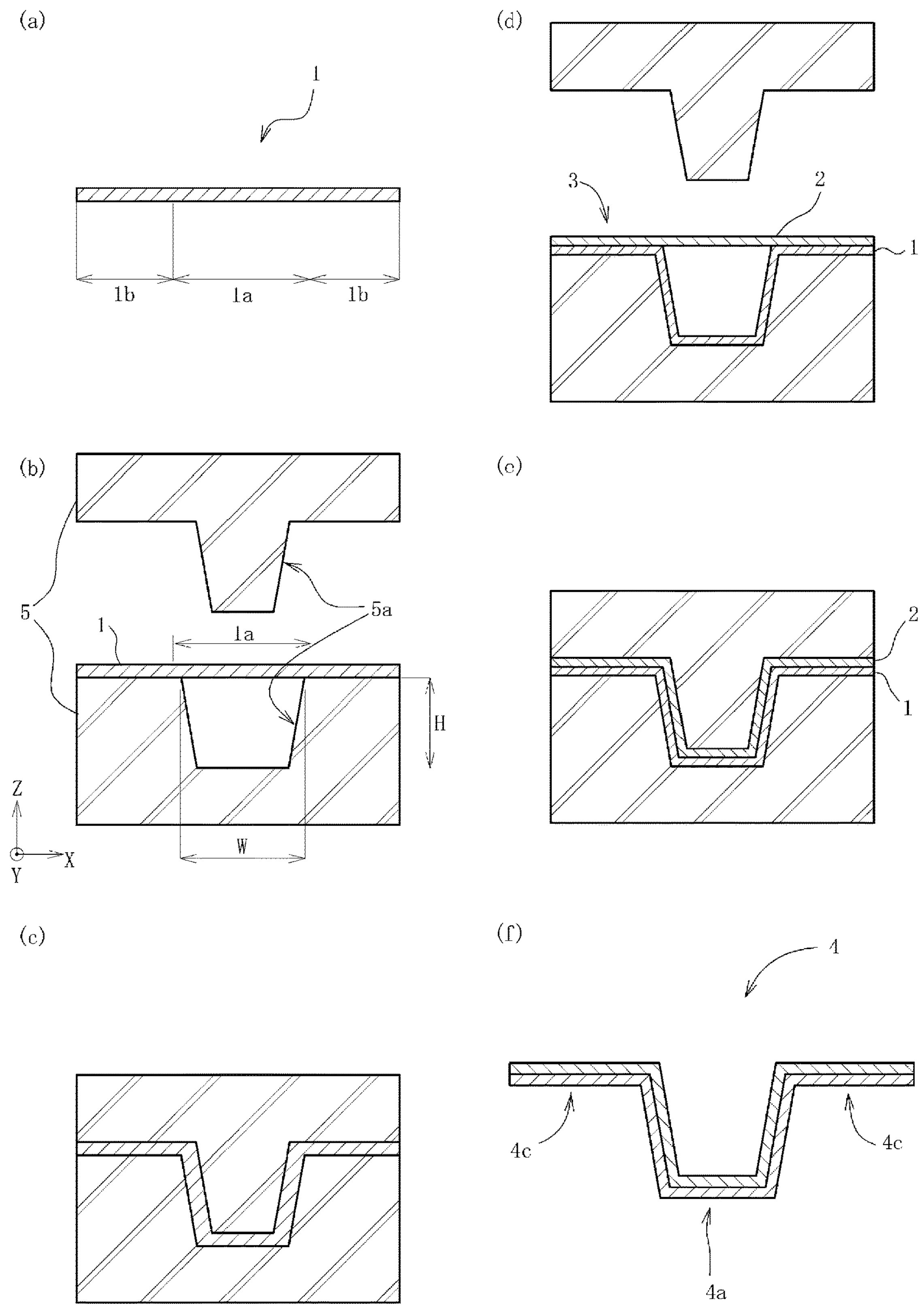
FIG. 1 is a schematic cross-sectional view illustrating a first embodiment of a method for fitting a paper sheet.

First, at least a partial region 1*a* of a paper sheet 1 is caused to absorb water (see FIG. 1 at (a)). A region other than the region 1*a* is a region 1*b* that is not caused to absorb water. The region 1*a* includes a region to be molded into a three-dimensional shape in a molding step described below. The region 1*a* caused to absorb water may be a part of the paper sheet 1 as in the drawing, or may be the whole paper sheet 1. The paper sheet 1 is caused to absorb water, and thus the paper sheet 1 is easily molded into a three-dimensional shape. A basis weight of the paper sheet 1 can be from 200 g/m$^2$ to 800 g/m$^2$. The basis weight of the paper sheet 1 is preferably from 350 g/m$^2$ to 600 g/m$^2$. Within the range, a paper sheet is less likely to be torn in the molding step and a fitting step described below. Further, the paper sheet 1 also has rigidity, and thus paper sheets 1 and 2 are tightly in close contact with each other in a fitting portion 4*a*.

A time to cause the paper sheet 1 to absorb water is proportional to its basis weight, and can be, for example, 10 seconds for 200 g/m$^2$, 10 minutes for 380 g/m$^2$, and 15 minutes for 570 g/m$^2$.

Placing Step

Next, the paper sheet 1 is placed such that the region 1*a* caused to absorb water is located between one set of first molding surfaces 5*a* of a press mold 5 (see FIG. 1 at (b)). The lower mold in the drawing includes a first molding surface having a recessed shape for molding one surface of a predetermined three-dimensional shape. A depth H of a recessed portion can be, for example, from 3 mm to 20 mm, and a width W of the recessed portion can be, for example, from 10 mm to 50 mm.

The upper mold includes a first molding surface having a protruding shape for molding the other surface of the predetermined three-dimensional shape. The first molding surfaces having the recessed shape and the protruding shape constitute the one set of first molding surfaces 5*a*. The paper sheet 1 is positioned and placed such that the region 1*a* of the paper sheet 1 caused to absorb water is located between the one set of first molding surfaces 5*a*.

In the first embodiment, a length of the paper sheet 1 in a Y direction is the same as a length of the press mold 5 in the Y direction, and a length of the paper sheet 1 in an X direction is the same as a length of the press mold 5 in the X direction. In other words, in a placing step, there is no portion of the paper sheet 1 protruding from the press mold 5 in a plan view.

Molding Step

Next, the press mold 5 is closed, and the region 1*a* of the paper sheet 1 caused to absorb water is molded into a three-dimensional shape by the one set of first molding surfaces 5*a* (see FIG. 1 at (c)). A pressure time can be, for example, 10 seconds, and a load can be, for example, 5 kN. The paper sheet 1 is pressed and also heated by the press mold 5. A mold temperature at this time can be, for example, 100° C. The paper sheet 1 is not completely dried by the heating. A reason for this will be described in the fitting step described below.

Layering Step

Next, the press mold 5 is opened, and another paper sheet 2 that is not caused to absorb water is layered on the molded paper sheet 1 (see FIG. 1 at (d)). A basis weight of the paper sheet 2 may be the same as or different from that of the paper sheet 1. However, when the basis weight of the paper sheet 2 is much less than that of the paper sheet 1 (for example, the basis weight of the paper sheet 1 is 570 g/m$^2$, whereas the basis weight of the paper sheet 2 is 200 g/m$^2$), a fitting portion may be wrinkled at a time of press in fitting, or the degree of fitting in the fitting portion may be reduced when the paper sheet is dried.

Note that the first paper sheet 1 and the second paper sheet 2 may be placed such that directions of fibers are different from each other. In this way, an edge portion of a three-dimensional shape is less likely to be torn.

Fitting Step

Next, the press mold 5 is closed, and a laminate 3 is molded into a three-dimensional shape by the one set of first molding surfaces 5*a*, and thus the molded paper sheet 1 and the another paper sheet 2 that is not caused to absorb water are fitted to each other (see FIG. 1 at (e)). As in the molding step, the laminate 3 is pressed and also heated by the press mold 5. A mold temperature at this time can be, for example, 100° C., a pressure time can be, for example, 60 seconds, and a load can be, for example, 5 kN.

As described above, in the molding step (see FIG. 1 at (c)), the paper sheet 1 is not completely dried, and is slightly swollen. Then, the paper sheet 1 is completely dried in the fitting step, that is, in second hot press molding. At this time, the paper sheet 1 contracts, and thus a fitting strength between the paper sheets 1 and 2 is increased.

Removal Step

Figure 2:
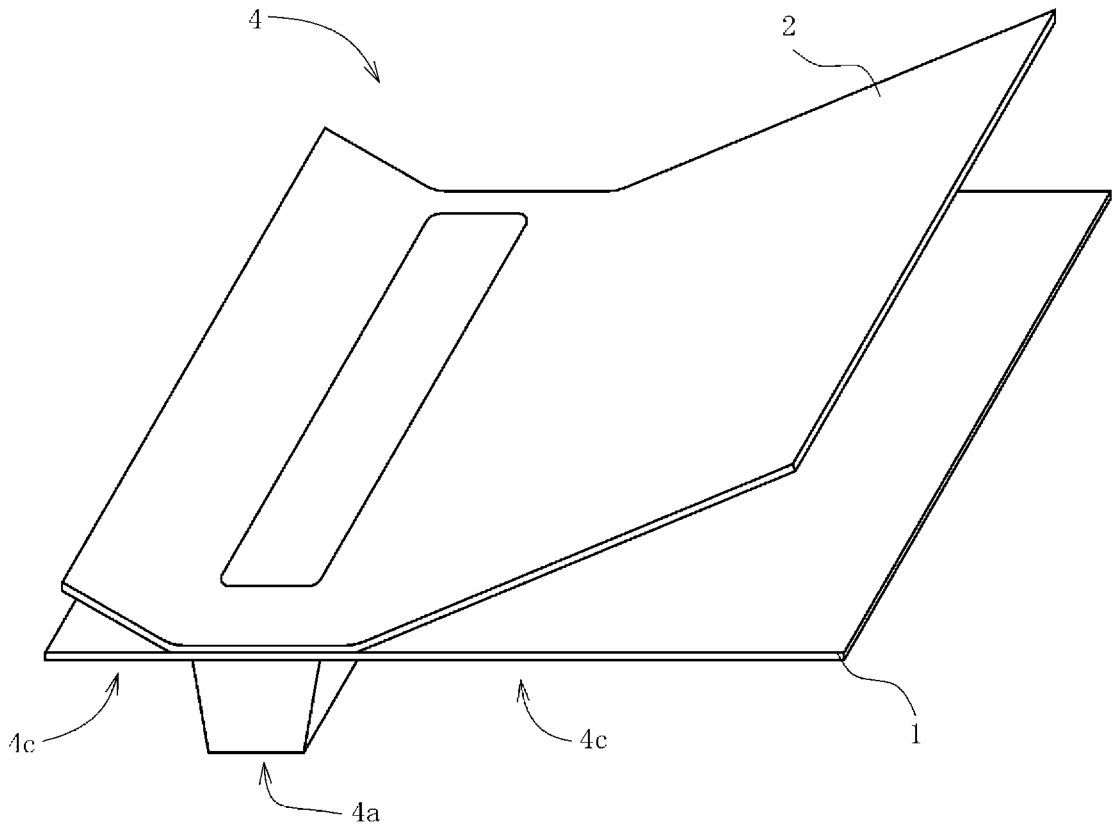
FIG. 2 is a schematic perspective view illustrating an example of a paper molded article obtained by the method in FIG. 1.

Finally, the press mold 5 is opened, and a paper molded article 4 is removed (see FIG. 1 at (f)). The paper molded article 4 includes the fitting portion 4*a* and a region 4*c* other than the fitting portion 4*a*. The entire paper molded article 4 is formed of two layers of the paper sheets 1 and 2 in a cross-sectional view as in FIG. 1 at (f), and the fitting portion 4*a* has a three-dimensional shape. The paper sheets 1 and 2 are not in close contact with each other in the region 4*c* other than the fitting portion 4*a*, and thus the region 4*c* other than the fitting portion 4*a* can be moved in an up-down direction as in FIG. 2, for example. In the fitting portion 4*a*, the paper sheets 1 and 2 are in close contact with each other, but are not bonded together. Thus, the paper sheets 1 and 2 can be separated from each other by holding the regions 4*c* of the paper sheets 1 and 2 and applying a force. In other words, the paper sheet 2 can be removed from the paper sheet 1.

In this way, the paper molded article 4 including the fitting portion 4*a* in which the two paper sheets 1 and 2 are fitted to each other can be easily obtained.

Modification Example of First Embodiment

Figure 3:
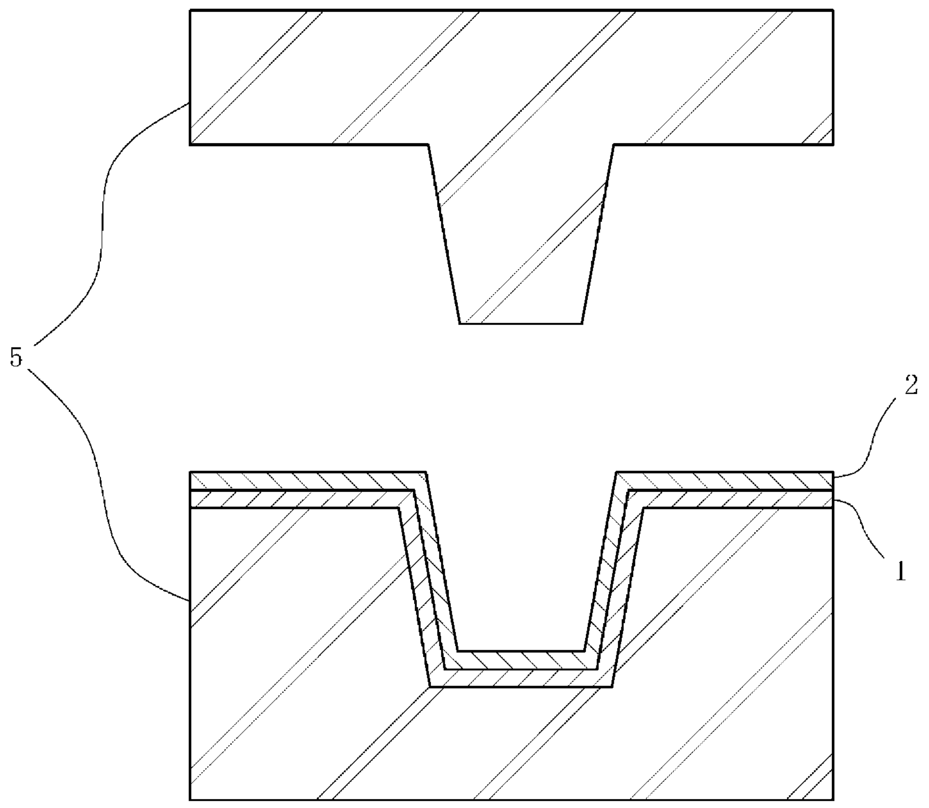
FIG. 3 is a schematic cross-sectional view illustrating one modification example of the first embodiment.

The first embodiment may include, before the fitting step (see FIG. 1 at (e)), a step of molding the another paper sheet 2 that is not caused to absorb water into the same shape as that of the molded paper sheet 1. In other words, the step is a step of molding, in advance, the another paper sheet 2 that is not caused to absorb water into the same three-dimensional shape as that of the paper sheet 1. The another molded paper sheet 2 is placed on the molded paper sheet 1 caused to absorb water (see FIG. 3), the press mold 5 is closed, and the paper sheets 1 and 2 are fitted to each other (see FIG. 1 at (e)).

In the modification example, the paper sheet 2 is molded in advance, and thus productivity can be improved.

Second Embodiment

A second embodiment of a method for fitting a paper sheet will be described with reference to FIG. 4. The second embodiment is different from the first embodiment in that the fitting method uses one paper sheet. Hereinafter, different points will be mainly described.

Water Absorption Step

Figure 4:
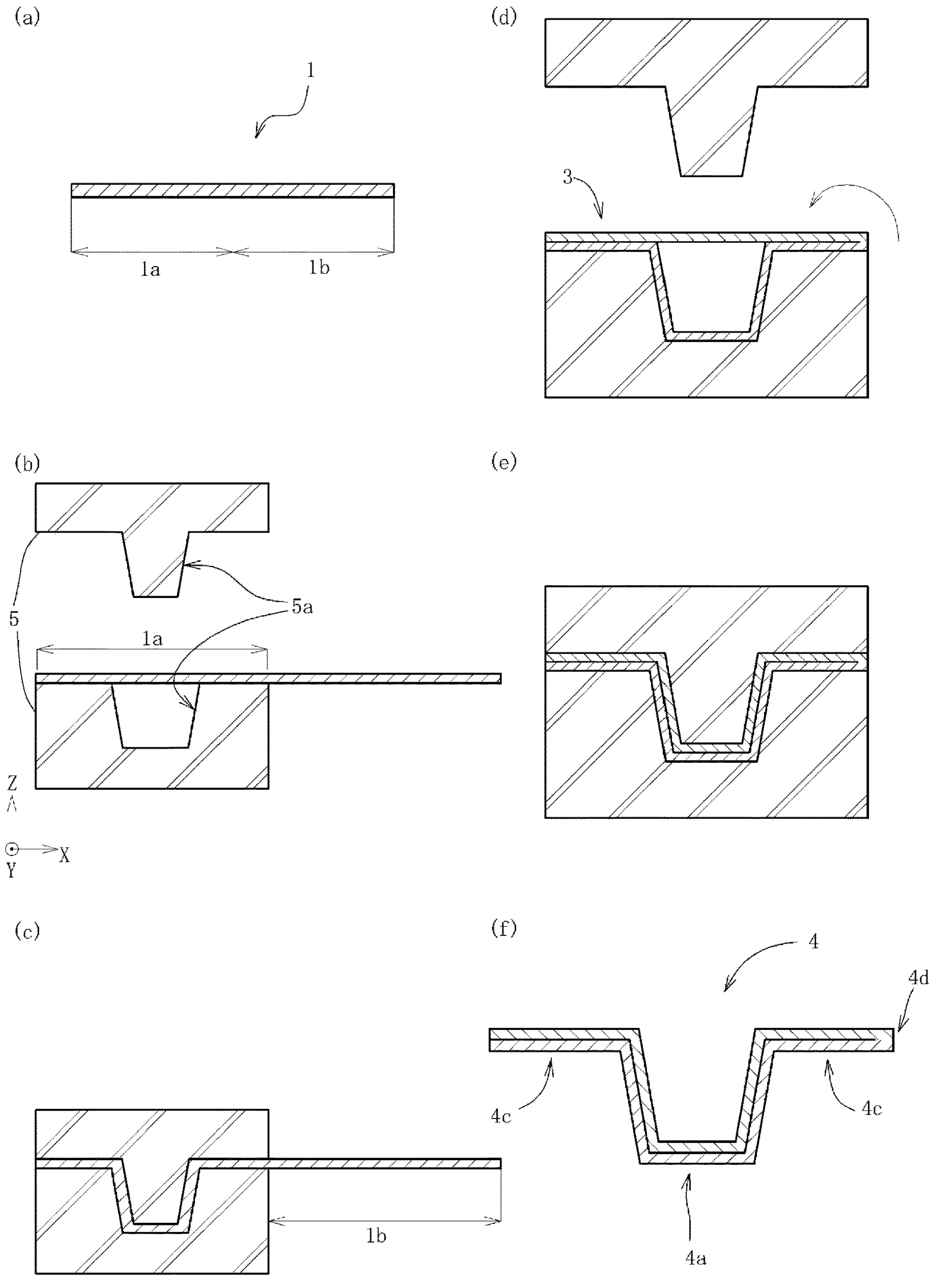
FIG. 4 is a schematic cross-sectional view illustrating a second embodiment of a method for fitting a paper sheet.

First, the region 1*a*, which is half of the paper sheet 1, is caused to absorb water (see FIG. 4 at (a)). The other half of the paper sheet 1 is a region 1*b* that is not caused to absorb water. The region 1*b* includes a region to be molded into a three-dimensional shape in a fitting step described below.

Note that the region that is caused to absorb water may not be the whole of the half region of the paper sheet 1, and may be a part of the half region of the paper sheet 1.

Placing Step

Next, the paper sheet 1 is placed such that the region 1*a* caused to absorb water is located between the one set of first molding surfaces 5*a* of a press mold 5 (see FIG. 4 at (b)). The paper sheet 1 is positioned and placed such that the region 1*a* of the paper sheet 1 caused to absorb water is located between the one set of first molding surfaces 5*a*. Since the region 1*b* that is not caused to absorb water is to be molded in a later fitting step, the region 1*b* is in a state of protruding from the press mold 5 at this time. In other words, in the second embodiment, a length of the paper sheet 1 in the X direction is longer than a length of the press mold 5 in the X direction. Further, a length of the paper sheet 1 in the Y direction is the same as a length of the press mold 5 in the Y direction.

Molding Step

Next, the press mold 5 is closed, and the region 1*a* of the paper sheet 1 caused to absorb water is molded into a three-dimensional shape by the one set of first molding surfaces 5*a* (see FIG. 4 at (c)). At this time, the region 1*a* of the paper sheet 1 is pressed and also heated by the press mold 5. As in the first embodiment, the region 1*a* is not completely dried by the heating.

Layering Step

Next, the press mold 5 is opened, and the region 1*b* of the paper sheet 1 that is not caused to absorb water is folded toward a molded paper sheet, and thus the molded paper sheet and the region 1*b* of the paper sheet 1 that is not caused to absorb water are layered (see FIG. 4 at (d)). The molded paper sheet refers to the region 1*a* of the paper sheet 1.

Note that, for easy folding, a fold or a cut may be formed at a boundary between the region 1*a* and the region 1*b*, or a thickness of the boundary portion may be reduced.

Fitting Step

Next, the press mold 5 is closed, and a laminate 3 is molded into a three-dimensional shape by the one set of first molding surfaces 5*a*, and thus the molded paper sheet and the region 1*b* that is not caused to absorb water are fitted to each other (see FIG. 4 at (e)). As in the molding step, the laminate 3 is pressed and also heated by the press mold 5. As described above, in the molding step (see FIG. 4 at (c)), the region 1*a* of the paper sheet 1 is not completely dried, and is slightly swollen. Then, the region 1*a* is completely dried in the fitting step, that is, in second hot press molding. At this time, the region 1*a* caused to absorb water contracts, and thus the fitting strength between the paper sheets in a fitting portion 4*a* is increased.

Removal Step

Figure 5:
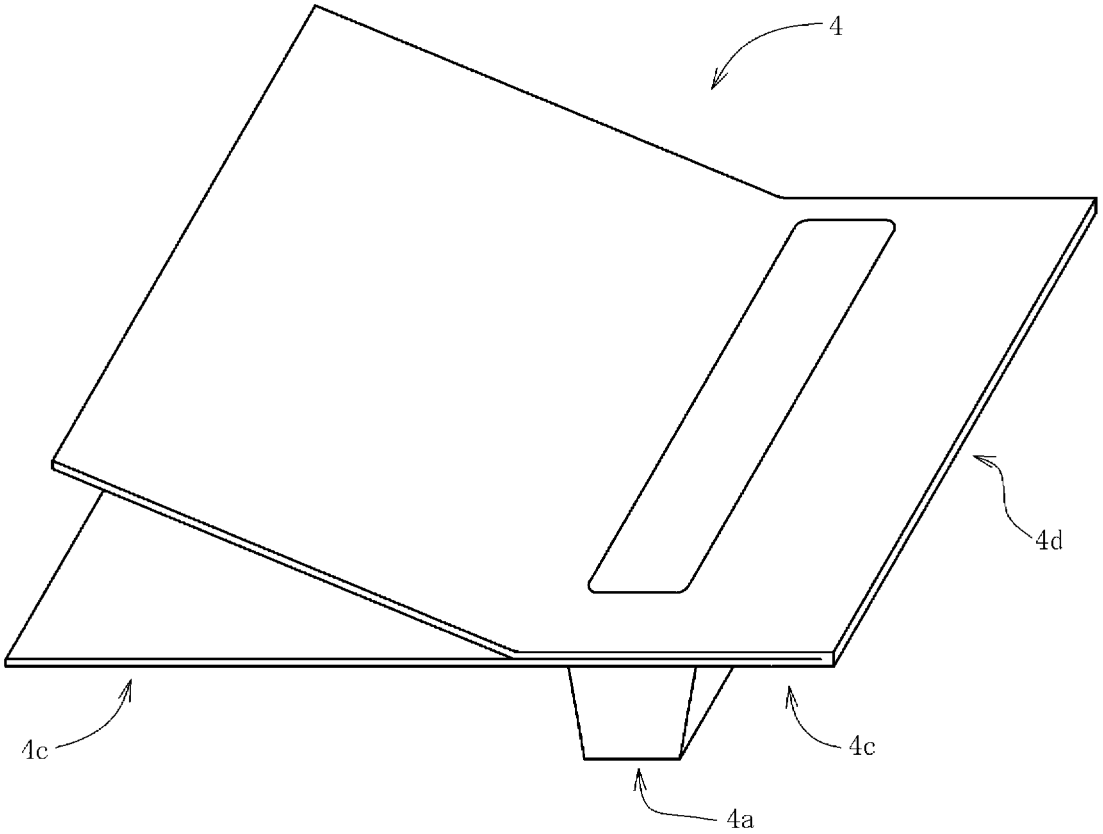
FIG. 5 is a schematic perspective view illustrating an example of a paper molded article obtained by the method in FIG. 4.

Finally, the press mold 5 is opened, and a paper molded article 4 is removed (see FIG. 4 at (f)). The paper molded article 4 includes the fitting portion 4*a*, the region 4*c* other than the fitting portion 4*a*, and a folded portion 4*d*. The entire paper molded article 4 is formed of two layers in a cross-sectional view as in FIG. 4 at (f), and the fitting portion 4*a* has a three-dimensional shape. The paper sheets are not in close contact with each other in the region 4*c* other than the fitting portion 4*a*, and thus the region 4*c* on a left side of the fitting portion 4*a* can be moved in the up-down direction as in FIG. 5, for example. However, the region 4*c* on a right side of the fitting portion 4*a* includes the folded portion 4*d*, and cannot thus be moved.

In the fitting portion 4*a*, the paper sheets 1 are in close contact with each other, but are not bonded together. Thus, for example, with reference to FIG. 5, the paper sheets 1 can be separated from each other by holding two regions 4*c* on the left side of the fitting portion 4*a* and applying a force. In other words, the upper paper sheet can be removed from the fitting portion 4*a*.

In this way, the paper molded article 4 including the fitting portion 4*a* can be easily obtained using the one paper sheet 1.

Modification Example 1 of Second Embodiment

Figure 6:
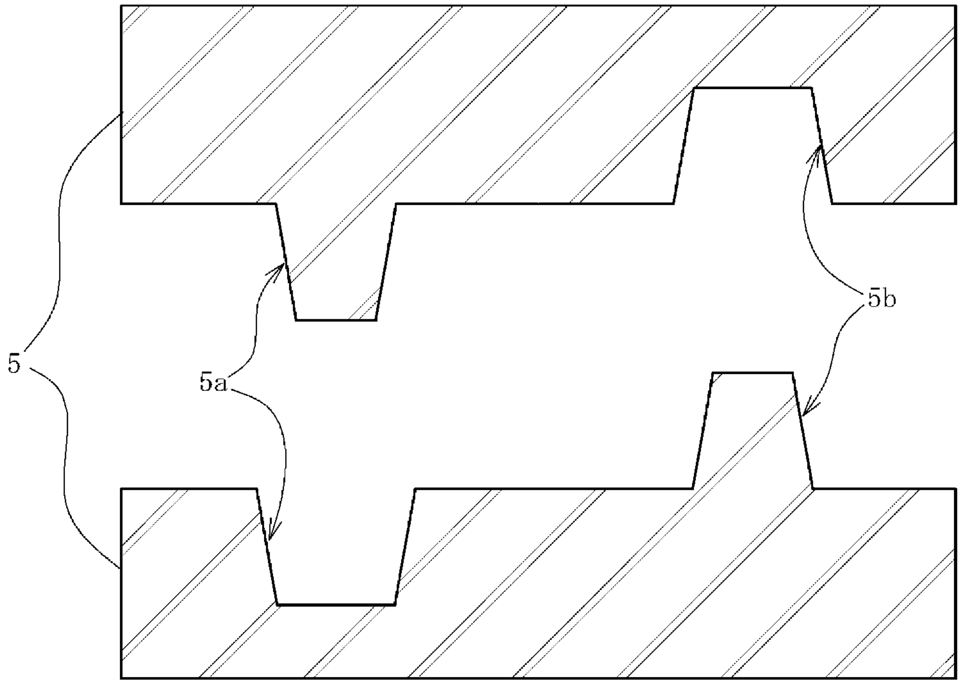
FIG. 6 is a schematic cross-sectional view illustrating another example of a press mold.

The press mold 5 may include one set of second molding surfaces 5*b* having a reverse shape to a shape of the one set of first molding surfaces 5*a* in a region different from the one set of first molding surfaces 5*a* (see FIG. 6). The lower second molding surface 5*b* of the one set of second molding surfaces 5*b* in the drawing includes a second molding surface having a protruding shape for molding one surface of a predetermined three-dimensional shape. The upper second molding surface 5*b* in the drawing includes a second molding surface having a recessed shape for molding the other surface of the predetermined three-dimensional shape. The second molding surfaces having the protruding shape and the recessed shape constitute the one set of second molding surfaces 5*b*. The one set of first molding surfaces 5*a* and the one set of second molding surfaces 5*b* face in directions opposite to each other in the up-down direction.

A fitting method using such a press mold 5 will be described (see FIG. 7).

Figure 7:
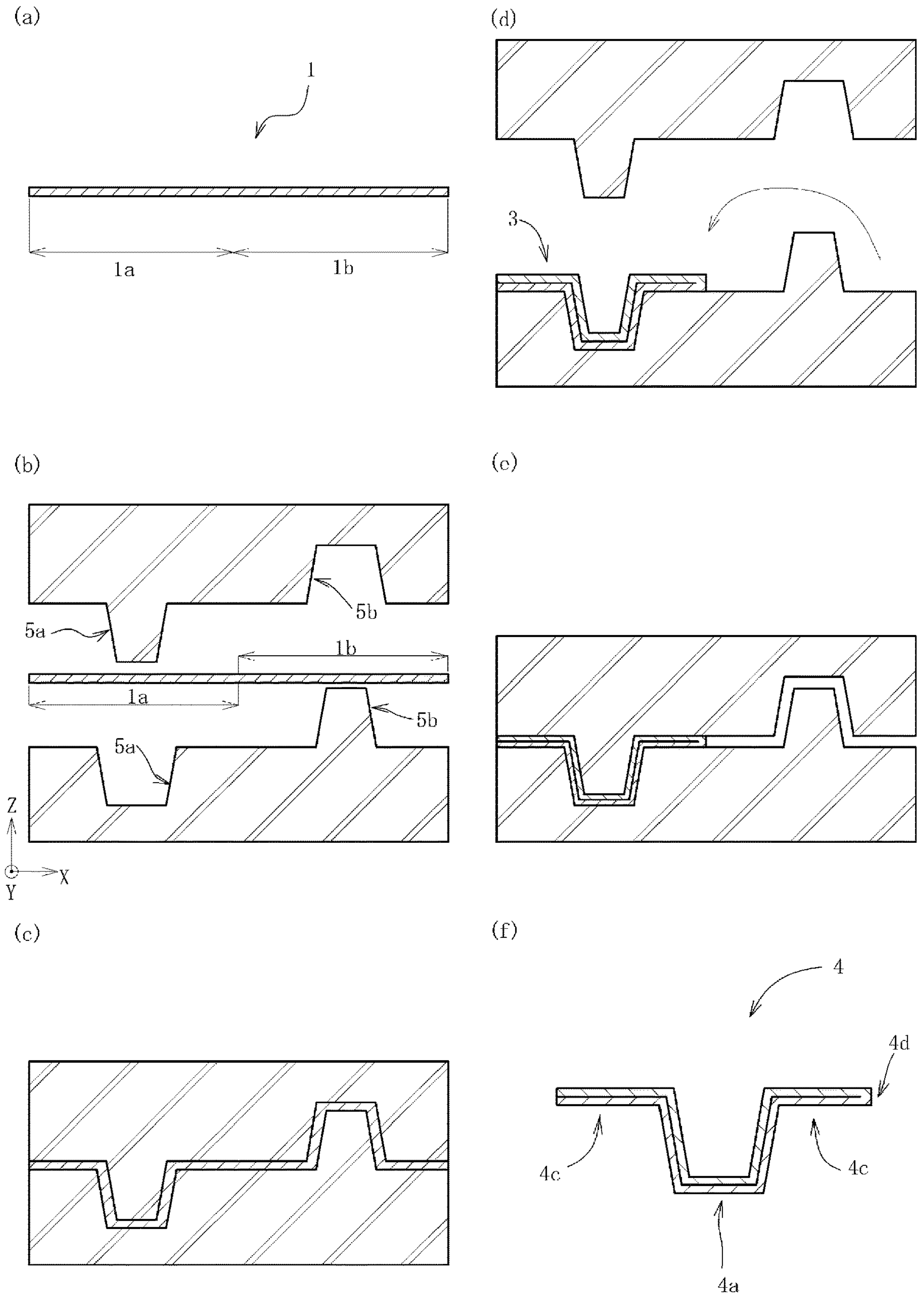
FIG. 7 is a schematic cross-sectional view illustrating one modification example of the second embodiment.

First, as in the second embodiment, the half region 1*a* of the one paper sheet 1 is caused to absorb water in a water absorption step (see FIG. 7 at (a)). The other half region is the region 1*b* that is not caused to absorb water.

Next, in the placing step (see FIG. 7 at (b)), the region 1*a* caused to absorb water is placed between the one set of first molding surfaces 5*a*, and the region 1*b* that is not caused to absorb water is placed between the one set of second molding surfaces 5*b*.

Next, in the molding step (see FIG. 7 at (c)), the press mold 5 is closed, and the region 1*a* caused to absorb water is molded into a three-dimensional shape by the one set of first molding surfaces 5*a*. At the same time, the region 1*b* that is not caused to absorb water is molded into a three-dimensional shape by the one set of second molding surfaces 5*b*.

Next, in the layering step (see FIG. 7 at (d)), the press mold 5 is opened, and the paper sheet (the region 1*b* that is not caused to absorb water) molded by the one set of second molding surfaces 5*b* is folded toward the paper sheet (the region 1*a* caused to absorb water) molded by the one set of first molding surfaces 5*a*. In this way, the one paper sheet having the three-dimensional shapes facing in directions opposite to each other in the up-down direction is caused to have a layered structure.

Next, in the fitting step (see FIG. 7 at (e)), the press mold 5 is closed, and the laminate 3 is pressed by the one set of first molding surfaces 5*a*, and thus the paper sheet (the region 1*a* caused to absorb water) molded by the one set of first molding surfaces 5*a* and the paper sheet (the region 1*b* that is not caused to absorb water) molded by the one set of second molding surfaces 5*b* are fitted to each other.

Finally, in the removal step (see FIG. 7 at (f)), the press mold 5 is opened, and the molded article 4 including the fitting portion 4*a* is removed. Similarly to the molded article in the second embodiment, the molded article 4 includes the folded portion 4*d* at one end portion.

In this way, one paper sheet is molded only once by using the press mold 5 including the two sets of molding surfaces 5*a* and 5*b*, and can thus be molded so as to have three-dimensional shapes facing in directions opposite to each other in the up-down direction. In other words, productivity can be improved.

Modification Example 2 of Second Embodiment

Figure 8:
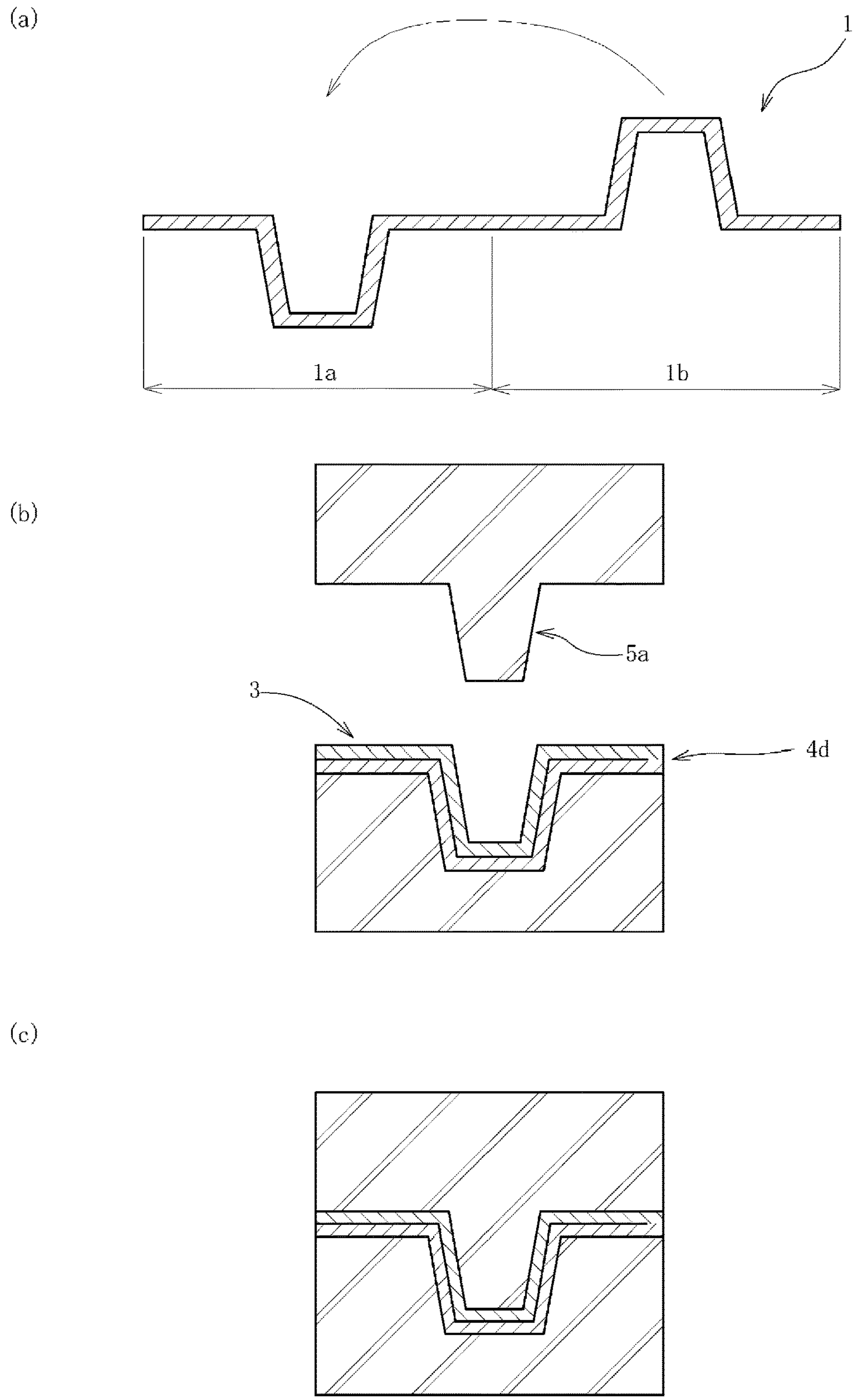
FIG. 8 is a schematic cross-sectional view illustrating one modification example of the second embodiment.

In the modification example 1 described above, the press mold 5 including the two sets of molding surfaces is used from the placing step (see FIG. 7 at (b)) to the fitting step (see FIG. 7 at (e)), but, after the molding step (see FIG. 7 at (c)), the press mold 5 including one set of molding surfaces may be used (see FIG. 8). After the molding step (see FIG. 7 at (c)), the paper sheet 1 molded into the three-dimensional shape is removed, and the paper sheet (the region 1*b* that is not caused to absorb water) molded by the one set of second molding surfaces 5*b* is folded toward the paper sheet (the region 1*a* caused to absorb water) molded by the one set of first molding surfaces 5*a* (see FIG. 8 at (a)). Next, the laminate 3 is placed between the one set of first molding surfaces 5*a* of the press mold 5 (used in the first embodiment, see FIG. 4) (see FIG. 8 at (b)). Next, the press mold 5 is closed, and the paper sheet is fitted (see FIG. 8 at (c)).

In the modification example, the two types of press molds are used differently, and thus a cycle time can be improved.

Modification Example 1 Common to Embodiments

In the first embodiment, the second embodiment, and the modification examples thereof, a step of changing a shape of a part of the fitting portion 4*a* into an undercut shape 4*b* may be included in the fitting step or after the removal step. The shape of a part of the fitting portion 4*a* is changed into the undercut shape 4*b*, and thus the fitting strength of the fitting portion 4*a* can be increased.

Figure 9:
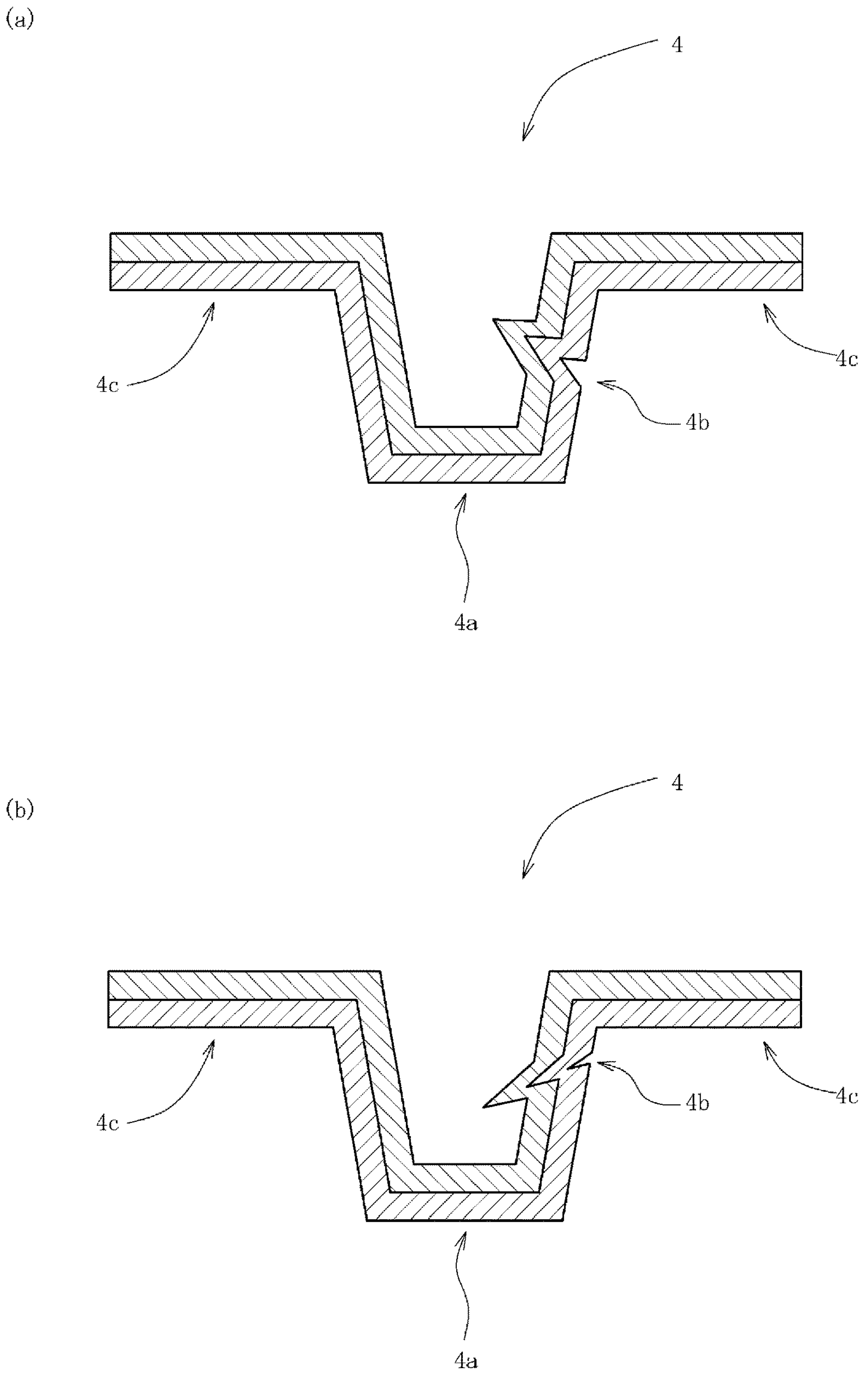
FIG. 9 is a schematic cross-sectional view illustrating one modification example common to the embodiments.

"Being performed after the removal step" means that additional processing is performed on the fitted paper molded article 4. For example, the shape of a part of the fitting portion 4*a* can be changed into the undercut shape 4*b* protruding toward the inside of the fitting portion 4*a* by, for example, a method in which the paper molded article 4 is placed on a jig and a place desired to cause to have the undercut shape 4*b* is pushed by a pin or the like (see FIG. 9 at (a)). Note that, as in FIG. 9 at (b), when the undercut shape 4*b* is caused to protrude more downward than that in FIG. 9 at (a), the fitting strength can be further increased.

Figure 10:
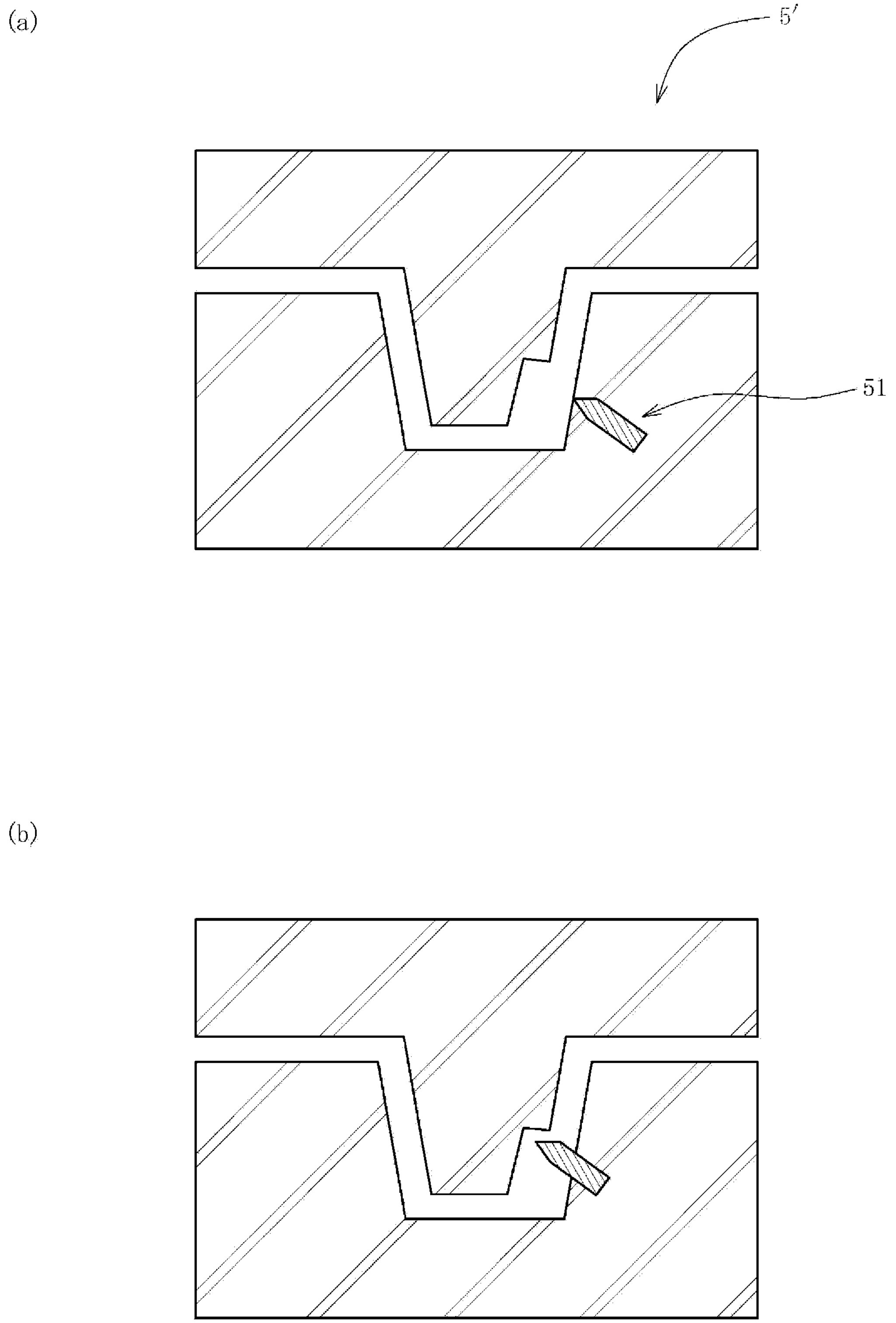
FIG. 10 is a schematic cross-sectional view illustrating one modification example common to the embodiments.

In order to change a shape into the undercut shape in the fitting step, for example, such a press mold 5' as illustrated in FIG. 10 can be used. A recessed mold (lower mold in the drawing of the press mold 5' includes a slide pin 51, and the slide pin 51 is accommodated inside the recessed mold in a step before the fitting step (see FIG. 10 at (a)). The slide pin 51 protrudes toward a protruding mold (upper mold in the drawing) of the press mold 5' in the fitting step (see FIG. 10 at (b)). A portion of the protruding mold corresponding to the undercut shape has a shape such that the protruding slide pin 51 can be avoided and a paper molded article can be easily removed from the press mold 5'.

Modification Example 2 Common to Embodiments

In the embodiments and the modification examples described above, a shape of the fitting portion in the plan view is a rectangle (see FIGS. 2 and 5), and a position of the fitting portion is closer to one end portion of the paper sheet, which is not limited thereto. For example, the fitting portion may have an X shape and may be placed at the center of the paper sheet in the plan view (see FIG. 11 at (a)), or two rectangles may be placed inclined at angles different from each other in the plan view (see FIG. 11 at (b)). The shapes and placements can further increase the fitting strength. Further, the fitting portion may have a circular shape in the plan view (see FIG. 11 at (c)), or two quadrangles may be placed at corners of the paper sheet in the plan view (see FIG. 11 at (d)).

Figure 11:
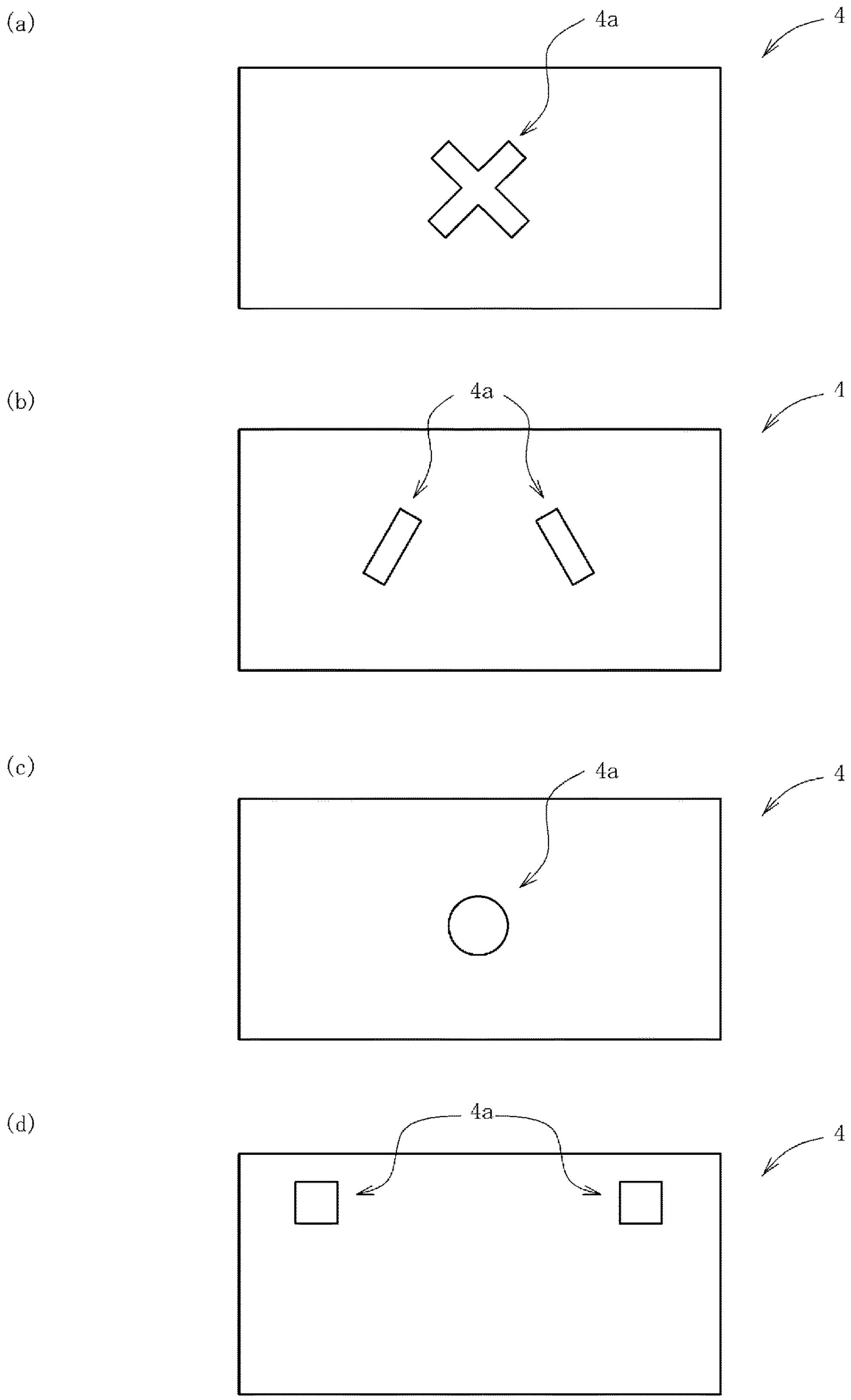
FIG. 11 is a schematic cross-sectional view illustrating one modification example common to the embodiments.
Figure 12:
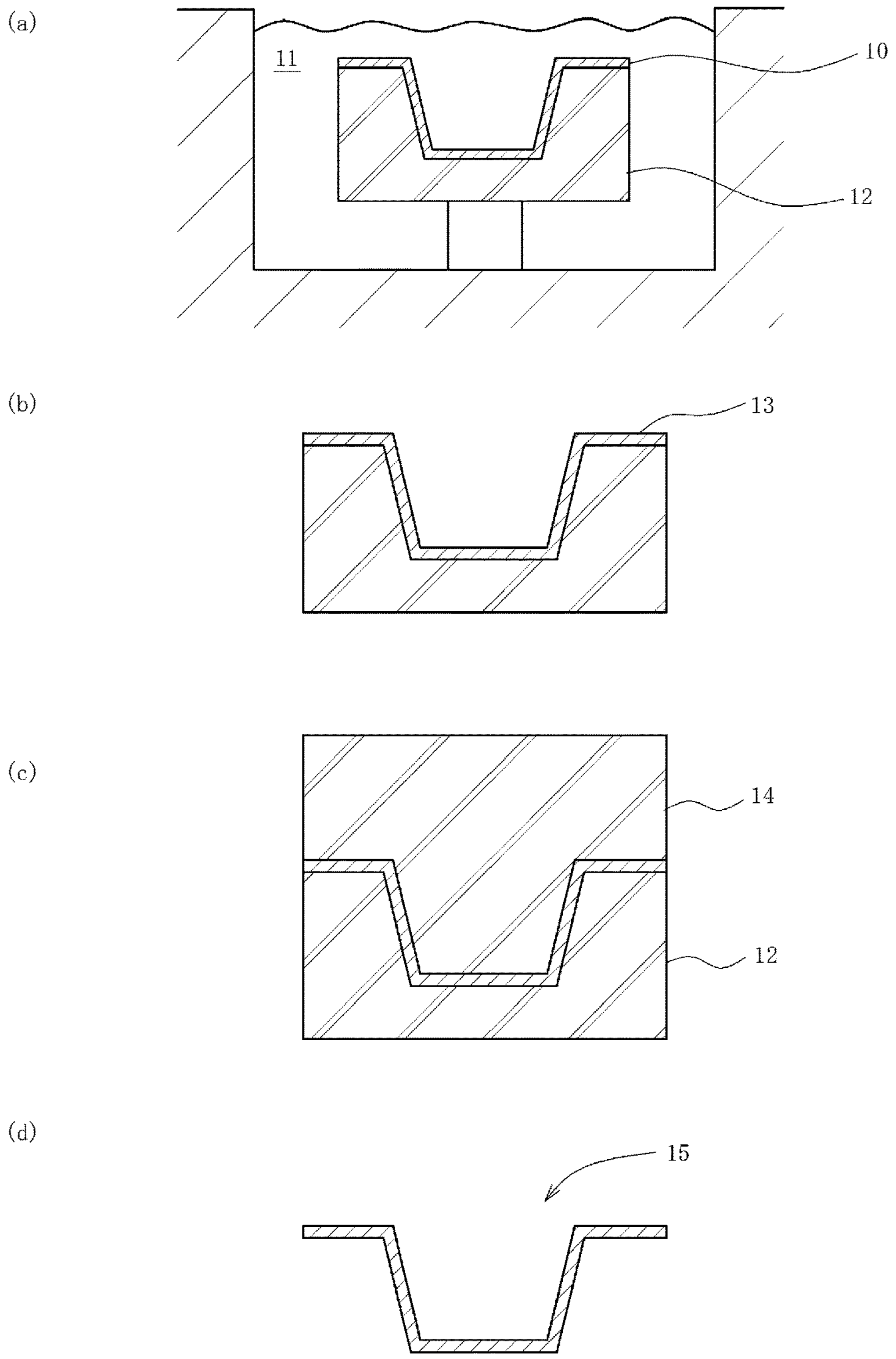
FIG. 12 CONVENTIONAL ART
FIG. 12 is a schematic cross-sectional view illustrating a conventional manufacturing method of a pulp molded article.
Figure 13:
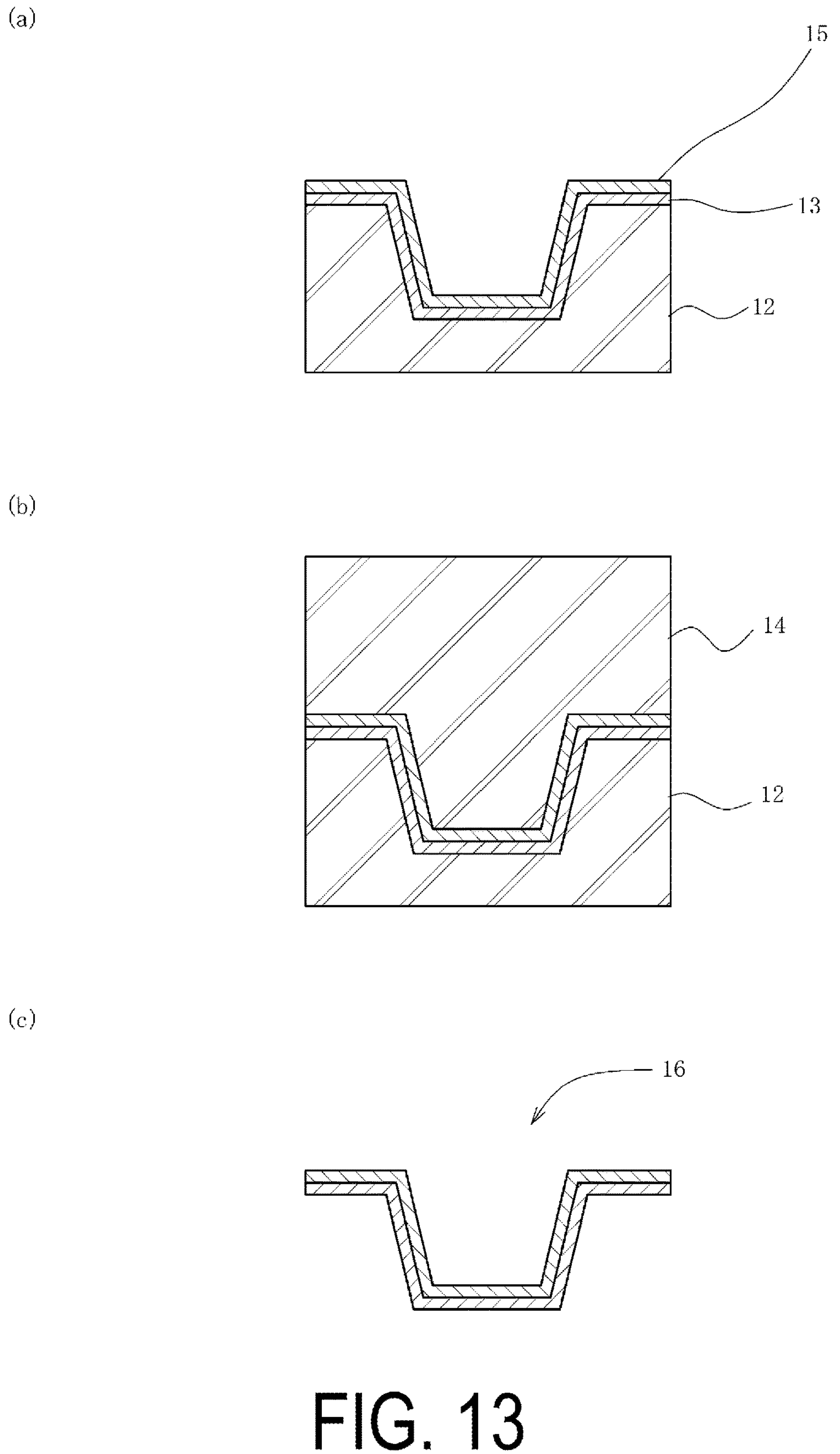
FIG. 13 CONVENTIONAL ART
FIG. 13 is a schematic cross-sectional view illustrating a conventional manufacturing method of a pulp molded article.

Note that the number of the fitting portions in FIG. 11 at (a) and (c) may be two or more, and the number of the fitting portions in FIG. 11 at (b) and (d) may be three or more.

Note that the paper molded article 4 illustrated in FIG. 11 may include the folded portion 4*d*.

REFERENCE CHARACTER LIST

1 Paper sheet
1*a* Region caused to absorb water
1*b* Region that is not caused to absorb water
2 Another paper sheet
3 Laminate
4 Paper molded article
4*a* Fitting portion
4*b* Undercut shape
4*c* Region other than fitting portion
4*d* Folded portion
5 Press mold
5*a* One set of first molding surfaces
5*b* One set of second molding surfaces
51 Slide pin
10 Pulp
11 Pulp suspension
12 Papermaking mold
13 Intermediate body
14 Pressing mold
15, 16 Pulp molded article

The invention claimed is:

1. A method for fitting a paper sheet, comprising:

a water absorption step of causing a region of a paper sheet to absorb water, the region being at least a part of the paper sheet;

a placing step of placing the region of the paper sheet caused to absorb water, such that the region is located between one set of first molding surfaces of a press mold;

a molding step of molding, using the one set of first molding surfaces, the region of the paper sheet caused to absorb water into a first three-dimensional shape, by closing the press mold;

a layering step of layering another paper sheet that is not caused to absorb water on the molded paper sheet, after opening the press mold;

a fitting step of fitting the molded paper sheet and the another paper sheet that is not caused to absorb water by closing the press mold to mold, using the one set of first molding surfaces, a laminate into a second three-dimensional shape; and a removal step of removing a molded article that is formed of the molded paper sheet and the another paper sheet after opening the press mold, wherein the molded article includes a fitting portion where the molded paper sheet and the another paper sheet are in close contact, the molded article further includes regions other than the fitting portion at both ends where the molded paper sheet and the another paper sheet are not in close contact, wherein the molded paper sheet and the another paper sheet are configured to be moved up and down, and the molded paper sheet and the another paper sheet are not bonded at the fitting portion.

2. The method for fitting a paper sheet according to claim 1, comprising:

a step of molding the another paper sheet that is not caused to absorb water into the same shape as a shape of the molded paper sheet, before the fitting step.

3. The method for fitting the paper sheet according to claim 1, wherein the paper sheet and the another paper sheet are one paper sheet, the region of the single paper sheet that is caused to absorb water is half of the one paper sheet, and the another paper sheet is a region of the one paper sheet that is not caused to absorb water.

4. The method for fitting the paper sheet according to claim 3, wherein the placing step places the one paper sheet such that the region of the paper sheet caused to absorb water is located between one set of first molding surfaces of a first press mold and a region of the paper sheet that is not caused to absorb water is located between one set of second molding surfaces provided in a region different from the one set of first molding surfaces and having a reverse shape to a shape of the one set of first molding surfaces;

the molding step molds, using the one set of second molding surfaces, the region of the paper sheet that is not caused to absorb water into a reverse three-dimensional shape to the first three-dimensional shape, by closing the first press mold;

the layering step layers the molded paper sheet using the one set of first molding surfaces and the molded paper sheet using the one set of second molding surfaces, by, after opening the first press mold, folding the molded paper sheet using the one set of second molding surfaces toward the molded paper sheet using the one set of first molding surfaces; and the fitting step fits the paper sheets molded by the first press mold to each other, by pressing a laminate after placing the laminate between molding surfaces of a second press mold with the same shape as a shape of the one set of first molding surfaces and closing the second press mold.

5. The method for fitting a paper sheet according to claim 1, wherein a basis weight of the paper sheet is from 350 $g/m^2$ to 600 $g/m^2$.

6. The method for fitting a paper sheet according to claim 1, comprising:

a step of changing a shape of a part of the fitting portion into an undercut shape in the fitting step or after the removal step.

7. The molded article manufactured according to the method of claim 1, wherein:

the paper sheet is formed of two layers;

the fitting portion is a portion of the paper sheet in which the paper sheet is formed into the second three-dimensional shape in a position closer to one end portion of the paper sheet in a plan view; and the paper sheet includes the regions other than the fitting portion, wherein in the fitting portion, the paper sheet on the outside in the fitting portion is in close contact with the paper sheet on the inside in the fitting portion by contraction of the paper sheet on the outside in the fitting portion, and the paper sheets are not in close contact with each other in the regions other than the fitting portion.

* * * * *